(12) United States Patent
Raiciu

(10) Patent No.: US 12,463,888 B2
(45) Date of Patent: Nov. 4, 2025

(54) METHOD FOR VERIFYING FLOW COMPLETION TIMES IN DATA CENTERS

(71) Applicant: AVAGO TECHNOLOGIES INTERNATIONAL SALES PTE. LIMITED, Singapore (SG)

(72) Inventor: Costin Raiciu, Bucharest (RO)

(73) Assignee: Avago Technologies International Sales Pte. Limited, Singapore (SG)

( * ) Notice: Subject to any disclaimer, the term of this patent is extended or adjusted under 35 U.S.C. 154(b) by 494 days.

(21) Appl. No.: 17/731,417

(22) Filed: Apr. 28, 2022

(65) Prior Publication Data

US 2023/0353472 A1  Nov. 2, 2023

(51) Int. Cl.
| | |
|---|---|
| *H04L 43/0882* | (2022.01) |
| *H04L 12/46* | (2006.01) |
| *H04L 43/10* | (2022.01) |
| *H04L 43/50* | (2022.01) |
| *H04L 45/74* | (2022.01) |

(52) U.S. Cl.
CPC ...... *H04L 43/0882* (2013.01); *H04L 12/4633* (2013.01); *H04L 43/10* (2013.01); *H04L 43/50* (2013.01); *H04L 45/74* (2013.01)

(58) Field of Classification Search
CPC . H04L 43/0882; H04L 12/4633; H04L 43/10; H04L 43/50; H04L 45/74; H04L 43/08; H04L 43/0876; H04L 43/16; H04L 43/12
See application file for complete search history.

(56) References Cited

U.S. PATENT DOCUMENTS

| | | |
|---|---|---|
| 7,808,983 B2 | 10/2010 | Joly |
| 8,880,681 B2 | 11/2014 | Moncaster et al. |

(Continued)

FOREIGN PATENT DOCUMENTS

| | | |
|---|---|---|
| WO | WO-2012/135442 A1 | 10/2012 |
| WO | WO-2022/023849 A1 | 2/2022 |

OTHER PUBLICATIONS

Handley Mark et al., "Re-architecting datacenter networks and stacks for low latency and high performance", SIGCOMM '17, Aug. 21-25, 2017, Los Angeles, CA, USA, pp. 29-42.

(Continued)

*Primary Examiner* — Chris Parry
*Assistant Examiner* — Dixon F Dabipi
(74) *Attorney, Agent, or Firm* — Foley & Lardner LLP

(57) ABSTRACT

Transmissions in a data center communications network are monitored at a sending computer, the transmission of data packets being controlled by control messages sent by a receiving computer. The monitor at the sending computer measures the time that a burst of data takes to be transmitted from the sending computer to the receiving computer. Based on feedback received from the receiving computer, the monitor at the sending computer calculates one of more estimated completion times for the transmission. The estimated completion times will approximately match the measured completion time if the network is not the bottleneck for communication. When there is a mismatch between the estimated and measured completion times, this is logged and the information is used to trigger analysis to detect the reason and possible causes for the network under-performing.

20 Claims, 3 Drawing Sheets

Encapsulation and Decapsulation

(56) References Cited

U.S. PATENT DOCUMENTS

| | | | |
|---|---|---|---|
| 8,937,950 | B2 | 1/2015 | Dunbar et al. |
| 9,019,990 | B2 | 4/2015 | Jaiswal et al. |
| 9,084,132 | B2 | 7/2015 | Briscoe et al. |
| 9,369,398 | B2 | 6/2016 | Chan et al. |
| 9,497,039 | B2 | 11/2016 | Greenberg et al. |
| 9,544,239 | B2 | 1/2017 | Gafni et al. |
| 10,038,766 | B2 | 7/2018 | Pfister et al. |
| 10,044,628 | B2 | 8/2018 | Chan et al. |
| 10,986,027 | B1 * | 4/2021 | Sears ............... H04L 12/4641 |
| 11,290,380 | B2 | 3/2022 | Raiciu et al. |
| 2002/0131363 | A1 * | 9/2002 | Beshai ............... H04L 47/829 370/230 |
| 2005/0003814 | A1 * | 1/2005 | Saito ............... H04W 64/00 455/435.1 |
| 2005/0243834 | A1 | 11/2005 | Fukuda |
| 2009/0059962 | A1 * | 3/2009 | Schmidt ............... H04N 21/4305 370/503 |
| 2010/0095021 | A1 * | 4/2010 | Samuels ............... H04L 47/781 709/235 |
| 2010/0322249 | A1 | 12/2010 | Thathapudi et al. |
| 2011/0016209 | A1 * | 1/2011 | Moncaster ............... H04L 47/31 709/224 |
| 2014/0119196 | A1 * | 5/2014 | Hui ............... H04L 41/065 370/241 |
| 2015/0365325 | A1 * | 12/2015 | Hwang ............... H04L 47/70 370/230 |
| 2019/0104207 | A1 * | 4/2019 | Goel ............... H04L 45/64 |
| 2020/0044973 | A1 * | 2/2020 | Hei ............... H04L 45/28 |
| 2020/0162589 | A1 * | 5/2020 | Vijayadharan ............... H04L 41/16 |
| 2020/0366610 | A1 | 11/2020 | Wang |
| 2021/0234798 | A1 * | 7/2021 | Sun ............... H04L 67/04 |
| 2021/0243128 | A1 | 8/2021 | Sears et al. |
| 2021/0258347 | A1 | 8/2021 | Batta et al. |
| 2022/0038371 | A1 * | 2/2022 | Raiciu ............... H04L 45/243 |
| 2023/0059019 | A1 * | 2/2023 | Asthana ............... G06N 3/02 |

OTHER PUBLICATIONS

Hu Shuihai et al: "Aeolus A Building Block for Proactive Transport in Datacenters", Proceedings of the Annual Conference of the ACM Special Interest Group on Data Communication on the Applications, Technologies, Architectures, and Protocols for Computer Communication, ACMPUB27, New York, NY, USA, Jul. 30, 2020 (Jul. 30, 2020), pp. 422-434, XP058476000.

International Search Report and Written Opinion dated Aug. 1, 2023.

Mohammed Alasmar et al: "SCDP: Systematic Rateless Coding for Efficient Data Transport in Data Centres (Complete Version)", arxiv.org, Cornell University Library, 201 Olin Library Cornell University Ithaca, NY 14853, Aug. 2, 2021 (Aug. 2, 2021), XP091022380.

Song H et al: "Postcard-based On-Path Flow Data Telemetry; draftsong-ippm-postcard-based-telemetry-07.txt", Internetdraft: IPPM, Internet Engineering Task Force, IETF; Standardworkingdraft, Internet Society (ISOC) ,No. 714 Apr. 2020 (Apr. 14, 2020), pp. 1-12, XP015139120.

* cited by examiner

FIG. 2 Encapsulation and Decapsulation

METHOD FOR VERIFYING FLOW COMPLETION TIMES IN DATA CENTERS

FIELD OF THE INVENTION

The present invention relates to a method for transferring information across a data center network, and in particular to networks comprising of a plurality of packet switches that provide a plurality of possible paths from a source computer to a destination computer.

The invention provides continuous monitoring so that performance of transfers can be verified so as to identify when the network is not performing as intended and to aid the location of network faults.

BACKGROUND OF THE INVENTION

Data center networks interconnect large numbers of computers and are constructed from a multitude of interconnected network switches. Examples of such switches are Ethernet switches, Infiniband switches and IP routers. To interconnect large numbers of computers, many switches are interconnected in such a way that if two computers are not directly connected to the same switch, then there are multiple paths though the network that packets of data sent between those computers might traverse.

One way to determine which path a packet takes is for the switches to run a routing protocol so as to determine multiple possible paths to the destination computer, and then to use a hash function of fields from the packet to choose between paths. If the fields being hashed have the same values in all the packets of an information transfer, then all the packets will traverse the same path through the network.

When switches use a hash to route all the packets of an information transfer to a single path, if many flows between different computers hash to paths that traverse the same network link, this can cause congestion, even if other possible paths had spare capacity. This is known as a flow collision. Flow collisions can cause the performance of the network to be lower than expected given the aggregate traffic load.

Another key problem in datacenter networks is when a computer sends a request to many other computers for information and they all respond simultaneously, overloading the network link to the destination computer. This is known as an incast. Incast traffic can cause very high packet loss rates, or if loss is mitigated by using large switch buffers or pausing the preceding switch, can cause the queues in switches to grow excessively large, causing unnecessarily high latency.

Datacenters are commonly provisioned so that there is enough capacity across the plurality of paths for the total expected traffic demand, but not enough capacity for every computer to send simultaneously. Although the aggregate capacity may be sufficient on average, as datacenter traffic is often bursty, for short periods of time this underprovisioning may impact the performance of data transfers even though switch traffic statistics based on multi-second averages do not reveal any congestion.

Typically computers sending in a datacenter use a congestion control algorithm such as that provided by the Transmission Control Protocol (TCP) or modified versions of this such as Datacenter TCP (DCTCP). There are many such algorithms used; such algorithms use packet loss, explicit congestion bits set in packets by switches, or increases in latency caused by network queues as signals for congestion. When congestion is encountered, the sender reduces its transmission rate accordingly to avoid overloading the network.

When a computer [5] sends to another computer across a datacenter network [1], it typically wants to transfer a fixed quantity of data in the shortest possible time. This data will be divided into packets and those packets sent across the network, with the congestion control algorithm dictating precisely when those packets are transmitted into the network from the sending computer [5]. In addition, if the sending computer [5] is simultaneously sending to a plurality of receiving computers, those flows will compete with each other for access to the network. The sending computer [5] will operate a queue of packets waiting for transmission over the network interface [13], and these packets will be sent one-by-one into the network. This queue may operate according to first-in, first-out principles, or it may operate as a form of fair queue, where packets to different receiving computers are sent in a form of round-robin manner. Many other queuing disciplines are known in the art, and can be utilized to determine the sending order of packets in to the network.

When a sending computer [5] sends a burst of data comprising multiple packets across the network [1] to another computer, how long it takes for this burst of data to be received will depend on the other destinations the sending computer [5] is sending to at that instant, whether an under-provisioned network is currently experiencing congestion due to the aggregate traffic level, whether the flow of packets collides with other flows in an otherwise uncongested network, how many senders are currently sending to the receiving computer at that instant, any failures in the network at that instant which may cause packet loss or excessive in-network queuing latency, and on how the congestion control algorithm at the sending computer [5] responds to all these network conditions. Given that most of these conditions are out of the control of the sending computer [5], and it has either no knowledge of these conditions or imperfect knowledge inferred from packet losses and latency measurements, it is usually not possible for the sending computer [5] to know if the network is actually functioning correctly, transferring the burst of data in the minimum time possible given the competing traffic, or if there is a problem with the network that causes the transfer to take longer than it should. In short, datacenter networks behave unpredictably under normal operational conditions, and so it is hard to determine whether a performance problem is the fault of the sending application software, the sending computer [5], the receiving computer, the receiving computer's application software, or the network connecting them.

In a large scale datacenter network there will commonly be one or more switch or link that has failed in some way. With many paths between each pair of computers, incast traffic causing loss and latency spikes, and each transfer using only a single pseudo-randomly chosen path, it is very difficult to know how well a transfer should perform. If a failure does not result in complete loss of communication it may only affect performance, and as performance is unpredictable, it may be hard to know that a failure has occurred. Such problems can sometimes be revealed using a mesh of probe test traffic between different computers. Pingmesh is one such system. However, such probe test traffic needs to be sent at a low rate to avoid disrupting operational traffic. Many network performance problems do not easily reveal themselves until the network is heavily loaded, so there is a limit to what such test traffic can reveal.

A number of solutions improve the predictability of network transfers by preventing network incast traffic patterns from causing overloads near to the receiving computer. pHost addresses the incast problem by having each sending computer [5] send a request-to-send (RTS) packet to the receiving computer. Thereafter, the receiving computer sends tokens to the sending computers [5]. The sending computer [5] then controls its sending rate based on information from the tokens. The receiving computer regulates the transmission of tokens so that the aggregate arrival rate of data at the receiving computer does not overwhelm the receiver's network link.

NDP addresses these problems by replacing the network transport protocol with a new protocol and by modifying the network switches. Once a queue in a switch reaches a certain size, new arriving packets are trimmed so that the payload is removed and only the NDP header remains. As the NDP header is small, many more trimmed packets can be sent than if they were not trimmed. These trimmed packets serve to tell the receiver which senders are trying to send. The NDP receiver then sends pull packets to request more data from the senders at a rate at which it can cope. In addition, because the switches do not often need to drop packets, different packets from the same transfer can be sent across different paths without the receiver confusing out-of-sequence packet arrival for packet loss.

Instead of using packet trimming or RTS, Aeolus sends the initial burst of traffic from a sender to a receiver using packets marked as low-priority. If there is no congestion near to the receiver, these packets will arrive normally. If there is congestion, these uncontrolled low-priority bursts will have minimal impact on established flows, greatly reducing the incast problem. In case all packets in the initial burst are lost, Aeolus also sends a normal priority probe packet after the low-priority burst, allowing the receiver to know a sender has become active in case all the low priority packets are lost. After this initial burst, an Aeolus receiver controls the sending rate from its sender using a token mechanism similar to pHost and NDP.

pHost, NDP and Aeolus all rely on the receiver controlling access to the network by sending credit to the sender; they differ in how this is done for the start of a transfer. By controlling access to the network, they reduce latency due to queuing and largely eliminate packet loss in the steady state. This makes network performance more predictable. NDP also sends different packets from the same transfer across different paths, evenly balancing load across the network paths. This further increases the predictability of network performance in the absence of network failures.

Although pHost, NDP and Aeolus all improve the predictability of the network by controlling incast traffic patterns, and therefore reduce the variability of transfer times for a particular incast traffic pattern, none of them address the question of how long a transfer of a burst of data across the network will actually take.

As a result, it can still be hard to understand why network performance is lower than expected. What is needed is a method for transferring data between computers in a data center in a performant and predictable manner, especially in the presence of incast and other competing traffic, such that the performance of network transfers can be continuously monitored and verified that the transfer takes a reasonable amount of time given the instantaneous load on the network. Whenever a transfer takes significantly longer than the minimum transfer time given the competing traffic, then the network is the problem. If a transfer takes a long time, but the delay is caused by accommodating competing traffic flows, then the network is doing the best it can under the circumstances.

What is needed is a method for monitoring data transfers and telling when the network is performing as well as possible given the traffic demands. Such a solution is needed, both for network operators who must remedy any network problems, and for users of such datacenter networks who need to know whether their application or the network is at fault when performance is inadequate.

Objects of the Invention

It is an object of this invention to enable the transfer of data across a data center network comprising of a plurality of network switches and network paths between computers in such a manner that high and predictable throughput can be achieved.

It is an additional object of this invention to allow the transfer of data across a data center network comprising of a plurality of network switches and network paths in such a manner that a wide range of problems that may occur within the network are detectable as abnormal by the sending or receiving computer using the data transfers themselves to probe the network.

It is an additional object of this invention that during the transfer of data across a data center network, performance limitations due to the network are distinguishable from performance limitations due to the sending or receiving computer and are further distinguishable from limitations due to traffic patterns causing the concentration of traffic at nodes in the network. In this manner, when maximum achievable network performance is less than expected, alerts are generated for further investigation.

Still other objects and advantages of the invention will in part be obvious and will in part be apparent from the specification and drawings.

SUMMARY OF THE INVENTION

When a sending computer [5] sends data to a receiving computer [5] in a data center network [1] in the absence of failures, how fast it should send depends on how many other sending computers [5] are sending to the same receiving computer [5], on whether the flow encounters congestion due to flow collisions or underprovisioning of the network core, and on whether the sender is simultaneously sending to other receiving computers [5].

After the transmission has started, the receiving computer [5] in the present invention sends credit messages to the sending computer [5]. On receipt of credit, if the sending computer [5] has data to send, it transmits an amount of data matching the received credit to the receiving computer [5]. The receiving computer [5] generates credit at a rate such that the total amount of credit it sends to all computers sending to that receiver in a time period matches the amount of data that can be sent over the network links connected to that receiving computer [5] in a time period of that duration.

When data is ready to be sent at the sending computer [5], but either insufficient credit is available to send the data immediately or the data arrived faster than the sender could otherwise send, the data is queued pending later transmission. The sending computer [5] maintains a virtual queue for each receiving computer [5] that it is currently sending to.

The sending computer [5] monitors these periods when data is queued for sending to a particular receiving computer [5]. These periods represent times when the network is a bottleneck. The sending computer [5] then monitors the arrival of credit from each receiving computer [5], and the number of receiving computers that the sender is currently sending to. In each time period, the maximum rate for the sending computer [5] to send to a particular receiving computer [5] is calculated from the fraction of outgoing edge link [6] capacity available at the sending computer [5] for any one receiver and the arrival rate of credit from that receiving computer [5].

The sending computer [5] measures the elapsed time from the time when a queue of data waiting to be sent to a receiving computer [5] starts to build until the time when the queue of data for that receiver has drained and the corresponding data been acknowledged by the receiving computer [5]. This is the actual measured flow completion time (FCT) for this burst of data.

The sending computer [5] also calculates the cumulative amount of data that can be sent during each time interval, as governed by the sender and receiver bounds, and computes the time that the amount of data in the burst should require for transmission and from this computes an estimate of the FCT for the burst transmission if the sender or receiver are the only bottlenecks. If the estimated FCT matches the measured FCT, then the network is performing as well as can be expected given the load at the sending and receiving computers. Otherwise the network [1] is underperforming.

In the present invention the sending computer [5] maintains statistics of how the measured and estimated FCTs compare, and sends this information to a monitoring computer for analysis.

When the monitoring computer detects that network performance is impaired more than is expected, in one embodiment the sending computer [5] can initiate trace through the network [5] so as to identify the cause of the impairment.

The invention accordingly comprises the several steps and the relation of more of such steps with respect to each of the others, and the apparatus embodying features of construction, combinations of elements and arrangement of parts that are adapted to affect such steps, all is exemplified in the following detailed disclosure, and the scope of the invention will be indicated in the claims.

It is to be recognized by one of skill in the art that the terms "software," "app," "module," "routine," or "sub-routine" may be used interchangeably in this specification to describe a software or component parts thereof. In some embodiments of the present invention, each described module or routine/sub-routine is a component part of a larger set of software instructions while in other embodiments each described module or routine/sub-routine act as independent software applications. It is also to be recognized by one of skill in the art that the term "database" as used may describe a single specific database, or a sub-section of a larger database.

The methods, systems, apparatuses are set forth in part in the description which follows, and in part will be obvious from the description, or can be learned by practice of the methods, apparatuses, and systems. The advantages of the methods, apparatuses, and systems will be realized and attained by means of the elements and combinations particularly pointed out in the appended claims. It is understood that both the foregoing general description and the following detailed description are exemplary and explanatory only and are not restrictive of the methods, apparatuses, and systems, as claimed.

BRIEF DESCRIPTION OF THE DRAWINGS

In the accompanying figures, like elements are identified by like reference numerals among the several preferred embodiments of the present invention.

Other aspects and advantages of the present invention will become apparent upon consideration of the following detailed description, wherein similar structures have similar reference numerals.

DETAILED DESCRIPTION

Figure 1:
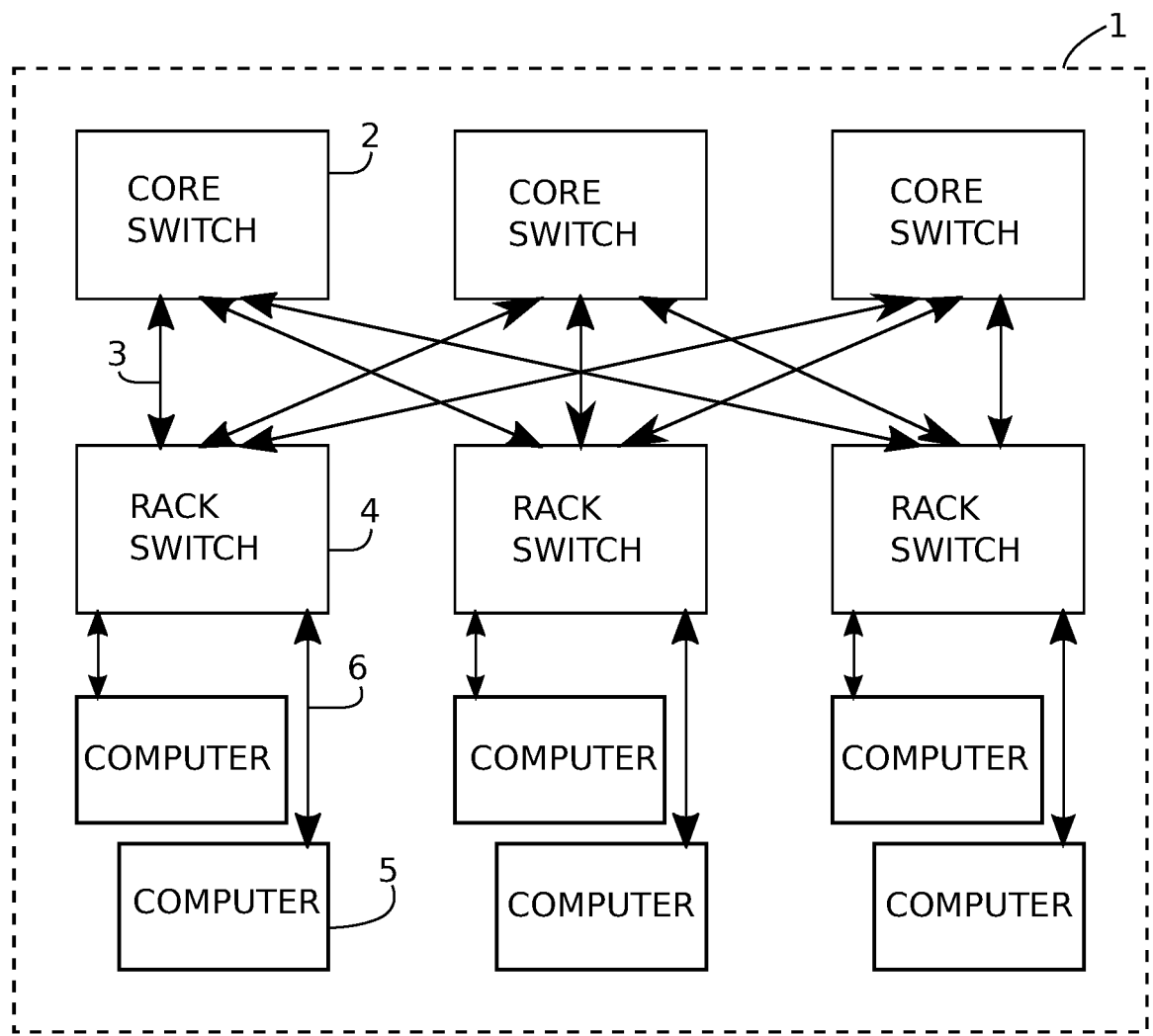
FIG. 1 is an example of a data center network topology.
Figure 2:
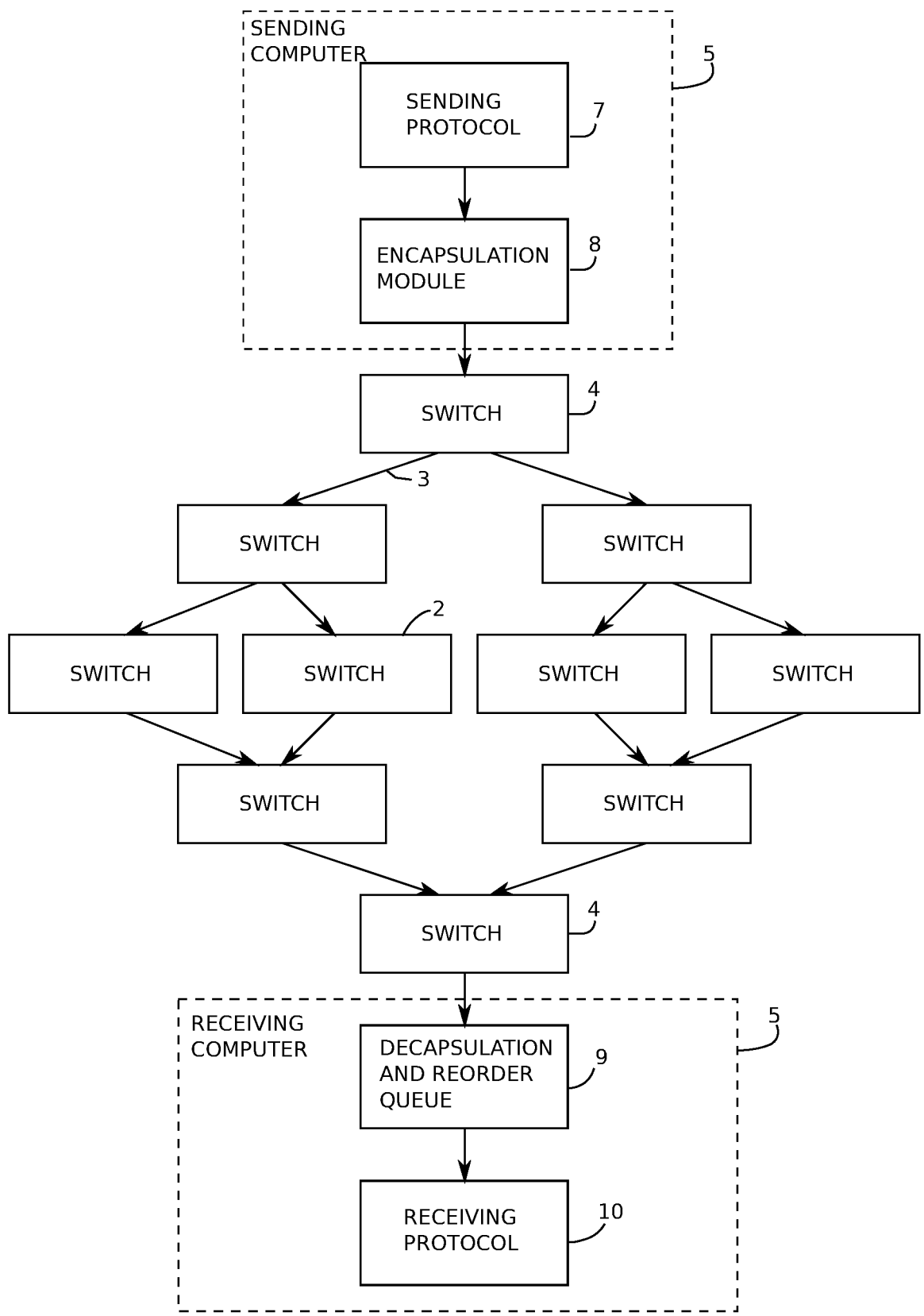
FIG. 2 shows where encapsulation, decapsulation and the reorder queue take place.
Figure 3:
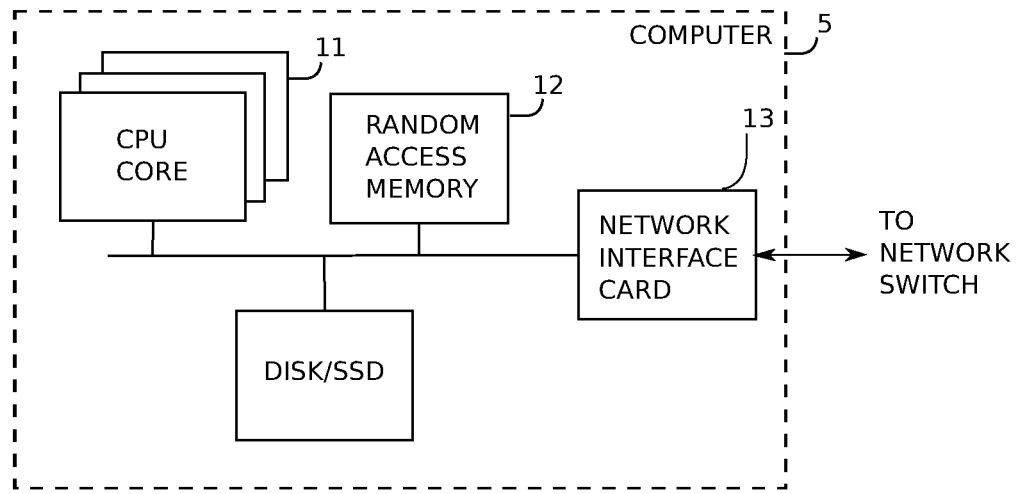
FIG. 3 shows the main components of a sending or receiving computer.
Figure 4:
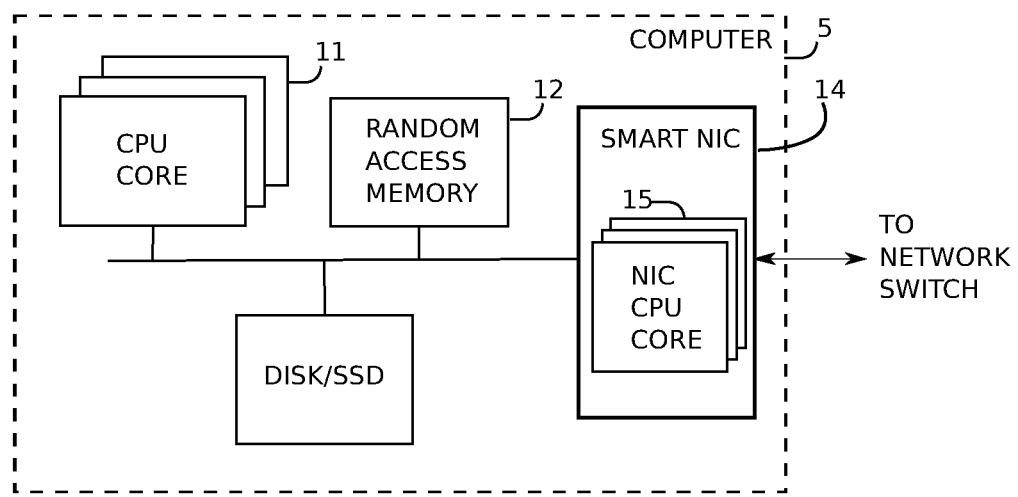
FIG. 4 shows the main components of a sending or receiving computer with a smart NIC.

The foregoing and other features and advantages of the invention will become more apparent from the following detailed description of exemplary embodiments, read in conjunction with the accompanying drawings. The detailed description and drawings are merely illustrative of the invention rather than limiting, the scope of the invention being defined by the appended claims and equivalents thereof FIG. 1 shows an exemplary data center network [1], as known in the art. A plurality of computers [5] are connected to edge switches [4] via network links [6]. Edge switches are themselves interconnected via inter-switch links [3] to other network switches [2]. In this way packets of data sent by a sending computer [5] connected to one switch [4] may be forwarded to a receiving computer [5] connected to a different switch [4] via a plurality of network paths. It will be understood that data center topologies in which the present invention is used will encompass many more computers connected to each switch [4], more switches and more layers of switches than shown in FIG. 1, and that different topologies are also possible.

It is common in prior art for a flow of packets from a sending computer [5] to a receiving computer [5] to take a single path through the network [1] to avoid being reordered. It is also common for the path to be selected from among the many possible paths by switches hashing fields from the packet header to select between possible paths to the receiving computer [5]. When the hashed fields remain constant for packets within a transfer but differ between transfers, the result of such hashing is that each transfer of data uses a single path but different transfers take different paths through the network [5]. This has the effect that the different links [3] in the network core are loaded unequally, which can result in some links being congested despite there being spare capacity on other paths to the same receiving computer. Such congestion causes performance to be variable, making it hard to predict the speed of a data transfer.

It will be understood that the roles of sending computer and receiving computer are defined with respect to a data transfer, and that a sending computer for one data transfer may be a receiving computer for another data transfer and vice versa, and that two such transfers may form a simultaneous bidirectional transfer.

A particular problem in data centers is incast traffic patterns, when many sending computers [5] attempt to send to a single receiving computer [5] simultaneously. Such incasts cause congestion, typically leading to packet loss as queues in switches close to the receiving computer [5] overflow, or cause very high latency as large switch buffers are used to absorb the arriving burst.

Another cause of reduced throughput is that a sending computer [5] is sending to multiple receiving computers [5] simultaneously. Such traffic patterns are known as outcast traffic. In such cases the outgoing link [6] is shared between the plurality of data flows, so each flow achieves lower throughput that it would otherwise manage.

In large data centers with very large numbers of switches and links, there will almost always be switches or links that are not performing correctly. Examples include links that have excessively high bit error rates resulting in packet losses, links that have negotiated to a lower bitrate that intended, or switches that have selected suboptimal routes to a destination.

The combination of assigning each transfer a single path selected pseudo-randomly by hashing, different transfers sometimes colliding on the same link, outcast and incast traffic patterns and various forms of failure or partial failure within the network makes it very difficult to predict how well a transfer across the network will perform. The present invention improves the predictability of network performance by addressing the aforementioned problems, and monitors transfers at the sending and receiving computers [5] so that performance problems can be identified and their cause located.

A number of mechanisms are known in the art which improve the predictability of incast traffic patterns. pHost and 1RMA use a request-to-send (RTS) message when a sender first wants to transmit a burst of data to a receiver. Upon receipt of an RTS message, the receiver adds the sender to its set of active senders. While there are active senders, the receiver sends credit message to the active senders such that the aggregate rate of credit being sent matches the receiver's incoming network link capacity. Upon receipt of credit from the receiver, a sender then attempts to transmit data packets whose total size matches the credit.

NDP uses a similar receiver-based credit system, but rather than sending an RTS message to start a transfer, the sending computer just sends data packets for one round trip time without waiting to hear from the receiving computer. NDP then relies on enhancements to network switches [4] close to the receiving computer [5]. When the queue at such a switch would overflow, NDP employs packet trimming, whereby the switch trims off the payload of the packet and forwards only the header to the receiver. This serves to reduce the overload due to incast while informing the receiving computer [5] which senders wish to send. The receiver then adds the senders to the active senders list, sends negative acknowledgments in response to any trimmed packets received, and starts sending credit as if it had received an RTS message.

Aeolus is similar to NDP, but does not rely on trimming support from the network switches. Instead the first burst of packets is sent indicating they wish to have low priority network service. If there is an incast at a switch close to the receiver, the switch will preferentially drop such low priority packets when its queue starts to fill. It is possible that all of the low priority packets of the initial burst from an Aeolus sender will be dropped, so Aeolus supplements this by sending a higher priority control message immediately after the low priority data packets indicating how many low priority packets were sent. This control message effectively serves as both a request to send and informs the receiver of packet loss so it can send negative acknowledgments to the sender.

What pHost, 1RMA, NDP and Aeolus share in common is the use of receiver based credit messages after the first round trip time so as to pace incast traffic. The present invention uses such a receiver-driven credit mechanism to inform a monitor at the sending computer [5] of the receiver's desired sending rate.

When data packets are ready to send from a sending computer [5] to a particular receiving computer [5], sometimes they can be sent immediately. If they cannot be sent immediately, either because the outgoing network link [6] or links are busy, or because the sender has not received sufficient credit from the receiving computer [5], then this is the start of a period of time where the network [1] is the bottleneck between the sender and receiver. When a packet cannot be sent immediately, it is added to a queue and will be sent when sender link capacity and received credit permit. The sending computer [5] maintains a queue for each receiving computer [5]. This may be in the form of separate buffers reserved for each receiving computer [5], or in the form of a virtual queue per destination from a single pool of packet buffer memory. There may also be multiple queues per destination computer, each reserved for a different category of traffic.

When a queue to a receiving computer [5] transitions from empty to not empty, this marks the start of a burst of traffic. While packets from this burst are being sent but the queue has not become empty, more packets of data may be enqueued. The burst ends when the queue next becomes empty. The time from the start of the burst to the end is the measured flow completion time (FCT). The sending computer [5] measures the amount of data sent in a burst and the time from when the burst started until it finished being transmitted.

Within a burst, during each time period which is typically a round trip time but could be shorter or longer as required, the sending computer [5] calculates the fraction of its link [6] capacity in that time period that it could use to send to this particular receiving computer [5], given the number of other receiving computers [5] the sender is currently sending to. The sender also calculates the amount of credit arriving from the receiving computer. The amount of data that should be sent in this time period is the minimum of the two quantities. After a burst finishes, the sending computer [5] then uses this information from all the time periods in the burst to calculate when the burst could have finished, if it was only limited by the sending or receiving computer [5]. This is the estimated FCT.

If the measured FCT is substantially longer than the estimated FCT, then the network [1] has under-performed. The monitor at the sending computer [5] logs when the network significantly underperforms.

In the preferred embodiment, the monitor at the sending computer [5] also measures the round trip time (RTT) from the sending computer [5] to the receiving computer [5] across the network [1] using one of the techniques well known in the art, such as by the receiver acknowledging receipt of packet sequence numbers or by the sender placing timestamps in data packets and the receiver echoing them in control packets.

The receiving computer [5] sends control packets to acknowledge the receipt of data packets. The receiving computer [5] may also send negative acknowledgment (NACK) packets to tell the sending computer [5] that a packet has been lost or has been trimmed. It will be understood that acknowledgment packets, NACK packets and credit packets can often be combined when sent from the receiving computer [5] to the sending computer [5]. The sending computer [5] then resends any missing packets in the usual manner. In this embodiment, the measured FCT is calculated from when the queue to a receiver first builds until the queue has emptied and all packets from within that burst have been acknowledged as received.

The estimated FCT then is also extended by an estimate of the round trip time across the network. Multiple different estimated FCTs can be calculated and used for different purposes by adding different estimates of the round trip time and other constraints.

The baseline estimated FCT adds a constant estimate of the RTT to that receiver, factoring in a small queue at one or more switches plus serialization times and speed-of-light latency on the expected path. This gives an estimated FCT given that the network core is uncongested and any flow collisions have minimal effect.

The minimum estimated FCT adds the lowest measured RTT to that receiver, as measured over many bursts. This gives an estimated FCT given that the network core is uncongested and no transient flow collisions occur, but if a persistent problem occurs for multiple burst durations or a sub-optimal path is persistently taken then this estimated FCT will include the additional time and not log it as abnormal.

The maximum estimated FCT adds the largest measured RTT during this burst. This gives an estimated FCT that includes worst-case queuing in switches as observed by this burst, but does not factor in any time needed to retransmit lost packets.

The retransmit estimated FCT adds the baseline calculated RTT, plus factors in the extra packets of data required for retransmission of any packets which were actually lost, as indicated from acknowledgments or negative acknowledgments, but does not factor in any addition latency for network queuing beyond the baseline.

It will be understood that other combinations of these estimated FCTs are also possible. In particular, minimum and maximum estimated FCTs can be extended to include the time needed to retransmit lost packets.

When the network [1] is performing well, all these estimated FCTs will be similar, and will be similar to the measured FCT. When the network has a problem, such as congestion due to flow collisions or packet loss, these estimated FCTs will differ from each other and some will differ from the measured FCT. When the measured FCT is substantially larger that a particular estimated FCT, the assumptions of that estimated FCT cannot be correct. Depending on which set of assumptions are violated, this indicates which forms of network problem are likely to have occurred.

The sender can also calculate an under-provisioned estimated FCT. When the network core is provisioned so that full bisection bandwidth is available, it is possible, at least in principle, for every sender to send simultaneously to a paired receiver at full link speed without the network being a bottleneck. It is common, however, for networks to be under-provisioned. For example, when a network is under-provisioned by a factor of four, then it is possible in principle simultaneously for every sender to send to a paired receiver at only a quarter of its link speed. The underprovisioning factor is a property of the network topology and so is known in advance.

For each of the aforementioned FCT variants, an under-provisioned version can also be calculated. In this case the estimated amount of data sent in each time period during a burst is the minimum of the sender's per-destination rate given how many receivers it is currently sending to, the sender's link rate divided by the underprovisioning factor, and the credit received from the receiver. Generally, the under-provisioned estimated FCTs will only be exceeded by the measured FCT when the network is exhibiting some form of failure, not simply due to congestion.

The aforementioned estimated flow completion times do not factor in what happens at the start of a transfer, when the sender has not yet received any credit from the receiver. For large bursts that take many round trip times to complete, this error in estimated FCT will not affect the invention's ability to identify when the network is under-performing. For small bursts, some additional compensation is required.

At the start of a transfer, in an embodiment using a request-to-send mechanism, it takes one round trip time across the network for the RTS packet to travel from the sending computer [5] to the receiving computer and for credit to return. Thus when a burst triggers a request to send packet to be sent, an additional RTT should be added to the estimated FCTs.

At the start of a transfer, in an embodiment using packet trimming or low priority packets to allow sending at line rate in the first round trip time, estimated FCTs that ignore retransmissions will give inaccurate results as most or all of the packets may be lost in the first round trip time if an incast traffic pattern occurs. In these embodiments all the estimated FCTs should include the additional data for retransmitted packets when calculating the estimated FCT, as with the retransmit estimated FCT.

In one aspect of the invention, rather than having all the packets of a transmission hash to a single path through the network, the packets of a single transfer are sent using many different paths. If the network switches support source-routing, this can be achieved by the sender source-routing each packet via a different path and spreading packets evenly across the known paths to the receiving computer. Alternatively this can be achieved by the network switches deciding which of multiple paths to take based on a hash of fields from the packet header and the sending computer [5] changing one or more of these fields that are hashed from one packet to the next so that the path that each packet takes is pseudo-randomly selected from the set of available paths. This is referred to as packet spraying.

When all sending computers [5] perform packet spraying, traffic is loaded much more evenly across the different links [3] in the network core. In the absence of failures, this will largely eliminate performance problems due to flow collisions, and so make flow completion times more predictable. The sending computer can then more accurately use the baseline estimated FCT and the under-provisioned baseline estimated FCT to determine whether the network is under-performing.

When only some of the sending computers [5] perform packet spraying, traffic is still more evenly loaded across the different links [3] in the network core than it would otherwise be. In one embodiment, the switches place sprayed packets in one queue class and non-sprayed packets in another queue class. By implementing fair queuing or weighted fair queuing between the two classes, the impact of the non-sprayed traffic on the predictability of the sprayed traffic is minimized, while the sprayed traffic is spread widely enough that it has will not cause flow collisions that are noticeable by the non-sprayed traffic. This improves performance for both classes of traffic and improves the ability of the invention to detect network problems.

In another embodiment lost data packets may not be retransmitted, but received packets may still be acknowledged. It may then not be possible for the sending computer to determine when the last packet in a burst was received, so instead both the measured and estimated FCT may be calculated to the last packet of the burst that was received.

In a preferred embodiment an encapsulation module [8] is used at the sending computer [5] to encapsulate data packets from a higher layer protocol [7] with an additional packet header before they are sent across the network. At the receiving computer a decapsulation module [9] at the receiving computer is used to remove the additional packet header before the packet is sent on to the receiving higher layer protocol [10]. Examples of commonly used higher-layer protocols are TCP, UDP and RDMA. In this embodiment the additional packet header contains a sequence number used to identify packets sent to the receiving computer [5].

Acknowledgment, NACK and credit packets are then sent from the decapsulation module [9] to the encapsulation module [8]. The encapsulation module [8] may optionally retransmit lost packets. Retransmission of dropped packets by the encapsulation module [8] is preferred when trimming or low priority packets are used at the start of transmissions to improve the performance of higher layer protocols in the presence of incast traffic patterns. The per-receiver send queues are then maintained in the encapsulation module [8], and it is the role of the encapsulation module [8] to calculate the estimated and measured FCTs and to log when they reveal network problems.

Using an encapsulation module [8] allows multiple simultaneous flows from higher layer protocols [7] from one sending computer to a receiving computer to be treated as a single flow for the purposes of credit and acknowledgment, and for the calculation of burst flow completion times. The encapsulation module [8] also allows higher layer protocols that do not have their own sequence numbers to be monitored effectively.

The encapsulation module [8] at the sending computer can reside in the computer itself, with the send queues stored in the computer's random access memory [12]. Alternatively the encapsulation module [8] can be implemented as a module in the sending computer's network interface card (NIC). In one embodiment the central processing unit (CPU) [15] on a Smart NIC [14] is used to run instructions that perform the encapsulation functionality of the encapsulation module [8]. The per-destination send queues may be stored in random access memory within the NIC [14], or alternatively control structures for the queues may be stored in random access memory within the NIC [13] but the packet data itself may be stored in the sending computer's random access memory [12] and only fetched to the NIC [13] using direct memory access when the packet is ready for transmission across the network. Similarly the decapsulation module [9] functions may be implemented in the receiving computer [5] or can be embodied in the receiving computer's network interface card [13].

In one embodiment, the encapsulation module [8] and decapsulation module [9] reside in the edge network switches [4] that are directly connected to the sending and receiving computer. When this is done, if the per-destination queue in the edge switch [4] receiving packets from the connected sending computer on their way to the receiving computer grows past a certain size, it may be necessary to pause the transmission of packets from the sending computer to that destination. For TCP flows, the sending edge-switch [4] may do this by reducing the receive window in the corresponding TCP acknowledgment packets. For flows that use Explicit Congestion Notification (ECN), the sending edge-switch may set ECN bits in the data packets traversing the edge-switch, or may directly change the acknowledgment packets of the higher layer protocol sent from the receiving computer to the sending computer [5] to indicate that the flow has observed congestion. For other flows, Ethernet flow control may be used to pause the sending of packets.

In another embodiment the sending computer [5] and receiving computer [5] do not use receiver credits to improve predictability, but instead rely on conventional sender-based congestion control algorithms as known in the art. In this embodiment, the flow completion time during an incast cannot be predicted with any accuracy, but at other times data traffic can still be used to probe for problems in the network [1]. To allow a monitor at the sending computer to distinguish between network problems and incast, the receiving computer [5] sends modified acknowledgment packets that indicate when the receiving computer is receiving from only that one sender. During a complete burst as measured from when data becomes available for transmission at the sending computer until the queue at the sending computer becomes empty, if the congestion control algorithm at the sending computer is not restricting the transmission rate to less than the sender's edge link [6] speed and simultaneously the receiving computer indicates that there is no other sender during the entire burst, then the burst can be used to probe network performance. During such a burst, the aforementioned measured and estimated FCTs can be calculated, compared and logged. While with this embodiment the monitor at the sending computer cannot continuously probe the network, when it does probe the network it does so with high rate traffic, so returns valuable information about network performance.

Each sender's logs of measured and estimated FCTs will be downloaded periodically for later analysis to determine how well the network is performing. In particular, if flows between senders or receivers in particular network locations are reporting that the network is under-performing, more detailed study can be performed.

A monitor at a sending computer [5] or sending edge-switch [4] observing a worse than expected FCT can also report it directly to a monitoring station. This monitoring station will typically be a separate computer [5] in the same data center that collects results from many sending computers. In this way, network problems can be detected in real-time using the data traffic itself to probe the network. The monitoring station maintains a connectivity map of the network topology, obtained either via configuration, via monitoring the network routing protocol, via polling the switches for their reachability, or via a combination of these methods. When problems are reported by multiple senders around the same time period the monitoring station can observe where the traffic paths overlap.

A fault may affect all the paths between a sender and receiver, or if it occurs in the core of the network it may only affect one path. When packet spraying is not being used, if the FCT reveals a problem, a sender may wish to trace which physical path through the network the packets traversed. Depending on the switch capabilities, this can be performed in a number of ways. The sender can perform a traceroute through the network in the manner known in the art: successive packets are sent with the IP time-to-live field limited so that packets time out at progressively further locations along the path. When a packet times out, the switch returns an ICMP packet to the sender informing it that the time was exceeded in transit. The source IP address in the packet reveals the IP address of the switch at that network hop. For this to work to reveal the path of the burst just completed, the fields in the traceroute packet headers that the switches hash to choose a path must be set by the sender to be the same as those in the data packets of the burst.

When the network topology is a Clos topology or similar regular topologies that are commonly used in datacenters, the entire path through the network is uniquely determined by the core switch [2] the path passes through. In such networks the sending computer [5] need not perform a full traceroute which is time consuming. Instead it will send a single traceroute packet with the time-to-live field set to time out at the core switch [2]. The single ICMP time-exceeded-in-transit response packet sent from the core switch [2] to the sending computer will reveal which of the possible paths the burst traversed.

Some network switches known in the art support in-network telemetry or dataplane telemetry. These features allow the switches themselves to annotate a packet traversing the network. The annotations can be used to reveal the path through the network and may also be used to reveal where along the path large queues have built. At the end of an unexpectedly slow burst transmission, a sender can send an information gathering packet along the same path that the burst took by using a packet header with the same values of the fields the switches use to select the path. The sending computer [5] will add the relevant extra fields to the packet headers needed to trigger in-network telemetry from the switches, allowing the path to be determined and help further identify the source of the network problem.

When the sending computer [5] reports an unexpectedly long FCT to the monitoring station it will then include the path with the report and any network telemetry it was able to gather. This information allows the monitoring station to associate the anomaly with the precise path. When multiple senders report unexpectedly large FCTs around the same time, the monitoring station can overlay their reports on its map to detect whether a single location in the network is common to a statistically significant fraction more reports than would be expected at random. In this way the locations of faults in the network can be identified.

When a sending computer [5] uses packet spraying, the different packets will take different paths through the network. The path of a specific packet is determined by its path ID, which itself may be hashed by the switches to choose the specific path for that packet. The path ID itself may consist of a single field such as the IPv6 flow ID, or may consist of multiple fields such as the source and destination addresses and ports that together form a path ID. In such cases the monitor at the sending computer [5] will record which specific path IDs correspond to anomalies such as unusually large round trip times, packet loss rates, or trimming rates.

On identifying from the FCTs that the network performance is unexpectedly low, the monitor at the sending computer can then trace the paths through the network for all the paths IDs used. This has the advantage that different paths can be compared to help localize a fault. However, doing this for every small burst is likely to be expensive in CPU time at the sending computer or in terms of extra traffic generated. Instead the monitor at the sending computer can just trace the path for path IDs that corresponded to anomalies. The specific paths responsible for the problem are then reported to the monitoring station.

In some cases it will be undesirable for the sender to proactively trace the anomalous path IDs. In such cases the monitoring station, upon receipt of the report of unexpectedly high FCT, can decide which reports it needs more information on. The monitoring station will then respond to the sending computer [5] asking that a traceroute be performed and specifying the path ID or path IDs to trace. This allows the monitoring station to control the aggregate volume of traceroute traffic so that it does not itself become a problem, and to stop tracing a known fault once its location is known.

It will be understood that the monitoring station may comprise more than one physical computer system [5] acting as a distributed system, as known in the art. In such a manner, reports from monitors at the sending computers to the monitoring station may be kept local to their part of the network, reducing overall network load. Such a distributed monitoring station has the advantage of being fault tolerant and able to cope with higher reporting levels.

It is possible under some circumstances for the sending computer, receiving computer or mechanisms used by the invention itself to become a bottleneck if it the CPU at the sending or receiving computer is not fast enough, or insufficient CPU time is allocated to the encapsulation or decapsulation modules. Should this occurs it is desirable that this situation is detected.

At a sending computer [5], if there is any queue to a receiving computer that is not empty and which has received sufficient credit to send, then it should be possible for the sending computer to saturate its edge-link [6] or links. The sending computer divides time into short periods, which may be as short as a round trip time, but could be longer. During each period it measures the amount of data transmitted over the edge link [6] including all packet headers. If the link requires any inter-packet spacing, the time allocated to this is also calculated. If, during that period, there was always a queue to a receiving computer that was not empty and which had received sufficient credit to send, then this period is classified as a link-limited period. If during a link-limited period, the amount of data actually sent after allowing for inter-packet spacing is less than that which could have been sent at full link speed, then the sending computer or encapsulation module is a bottleneck. Such periods should be logged.

At a receiving computer [5], the amount of credit sent per time period is recorded. If the receiving computer is not a bottleneck and there are senders requesting to send, the amount of credit sent should match the receiving computer's edge link [6] speed. If the amount of credit sent in such periods is less than it should be, the receiving computer is a bottleneck. Such periods should be logged.

At a receiving computer [5], when credit is sent, the number of sending computers requesting credit is also reported to the sending computers. Alternatively fraction of the receiver's credit allocated to a specific sending computer [5] in this time period can be reported to the sending computer. Upon receipt of credit, the sending computer can verify if the amount of credit received matches the amount it should have received in that time period. If the amount of credit received is less that it should have been, then the credit mechanism is itself a bottleneck. Such periods should be logged.

Those of ordinary skill in the art will understand and appreciate the aforementioned description of the invention has been made with reference to certain exemplary embodiments of the invention. Those of skill in the art will understand that obvious variations in construction, material, dimensions or properties may be made without departing from the scope of the invention which is intended to be limited only by the claims appended hereto

The invention claimed is:

1. A method of monitoring transfer of data between a first computer and a second computer across a packet switched communications network, the method comprising:

transmitting a burst of data from the first computer to the second computer;
identifying a duration of the transmission from the first computer to the second computer through a monitor at the first computer wherein the first computer maintains a queue of the data of the burst awaiting transmission to the second computer, wherein the duration of the transmission for the burst of data is a time from a start of transmitting the data of the burst in the queue to the queue being empty;
during the transmission the monitor receiving feedback packets from the second computer indicating an amount of credit at the second computer that the transmission can use;
further during the transmission, the monitor identifying a fraction of link capacity of the first computer that the transmission can use for the second computer given a number of other receiving computers the first computer is transmitting data; and
further during the transmission, the monitor identifying a minimum between the amount of credit arriving from the second computer and the fraction of the link capacity calculated by the first computer for transmission to the second computer and calculating an expected completion time for the transmission to the second computer based on the minimum; and,
wherein the monitor compares the expected completion time to the duration of the transmission, further the monitor identifies and logs any mismatch between the duration and the expected completion time.

2. The method of claim 1, characterized in that before the transmission of the burst of data, the first computer sends a control packet to the second computer requesting permission to send, the first computer starting transmission of the burst of data on receipt of permission to send from the second computer, the monitor including the time from sending of the request until receiving the permission in the calculated expected completion time.

3. The method of claim 1, characterized in having a plurality of paths through the communications network from the first computer to the second computer, the packet switches determining paths of each packet using a function of values of fields from headers of the packets of the data transfer.

4. The method of claim 3, characterized in that the fields from the headers of the packets are set by the first computer so that the transfer uses a single path from the plurality of paths, further characterized in that upon determining that the calculated expected completion time and the duration are not in agreement, the monitor sends a trace packet into the network to trace the single path through the network used by the transfer, the trace packet containing the same values of the header fields used by the packet switches to determine the path so that the trace packet takes the same path through the network as the packets comprising the transfer, the monitor logging the path for further analysis.

5. The method of claim 3, characterized in that, the first computer varies the value of the fields within the packet header used by the function so as to balance load across the plurality of paths so that packets comprising the data transfer traverse a plurality of paths.

6. The method of claim 5 characterized in that upon determining that the calculated expected completion time and the duration are not in agreement, the monitor sends a plurality of trace packets into the network, the monitor varying the header fields of the trace packets so that the plurality of paths used by the data packet are traced.

7. The method of claim 6 characterized in that the monitor adds extra header fields so that the trace packets use in-network telemetry to reveal problems on the plurality of paths.

8. The method of claim 1, characterized in that:
the monitor is part of an encapsulation module at the first computer comprising a processor;
the encapsulation module receives packets from a sending protocol at the first computer and adds an additional packet header to the packets before the packets leave the first computer wherein the additional packet header containing a sequence number used to identify individual packets;
a decapsulation module at the second computer decapsulates the packets before the packets are processed by a receiving protocol wherein the feedback packets from the second computer sent to the first computer are originated by the decapsulation module and contain credit; and
further the encapsulation module sends the packets to the decapsulation module at a rate matching arrival of credit from the decapsulation module, wherein the monitor uses the arrival of credit as part of the calculation of the expected completion time.

9. The method of claim 8, characterized in that the monitor calculates the amount of data the encapsulation module could have sent during a time period where the queue of data awaiting transmission to the second computer exists, further the amount of data that could have been sent being constrained by the receipt of credit from the decapsulation module, wherein the monitor also observes data sent to the decapsulation module in the time period, further wherein the monitor compares the calculated data that could have been sent to the data observed to be sent, and the monitor logs any mismatch that indicates the encapsulation module is underperforming.

10. The method of claim 8, characterized in that the sending protocol is Transmission Control Protocol or Remote Direct Memory Access.

11. The method of claim 8, characterized in that one or more of the tasks performed by the encapsulation module is performed using a central processing unit (CPU) core that is part of a network interface card in the first computer.

12. The method of claim 8, characterized in that when a queue in a packet switch in the communications network exceeds a configured threshold, the packet switch trims off a payload of a packet, discarding the payload and forwarding only the header to the second computer, upon receipt of the trimmed header, the decapsulation module sending a control message to the encapsulation module indicating that the payload was removed, the encapsulation module subsequently retransmitting the packet, the monitor including the time to retransmit said packet in the calculated expected completion time.

13. The method of claim 1, characterized in that upon logging the mismatch, the monitor at the first computer sends a report of said mismatch to a monitoring station, the monitoring station requesting the monitor trace a path through the network taken by the transfer, the monitoring station comparing paths from a plurality of reports sent by a plurality of monitors located at a plurality of first computers, the monitoring station using the plurality of reports to determine a location in the network that is suffering from a fault.

14. A system comprising:
a sending computer having a queue of data awaiting transmission to a receiving computer;

wherein the sending computer is configured to:
transmit a burst of data, from the queue of data, to the receiving computer;
receive, during transmission of the burst of data, from the receiving computer an amount of credit for the sending computer to transmit data to the receiving computer;
identify, during transmission of the burst of data, a fraction of link capacity of the sending computer that can be used for the sending computer to transmit the burst of data given a number of other receiving computers to which the sending computer is transmitting data;
determine a duration of the transmission of the burst data based on at least a time from a start of transmission of the burst of data from the queue to a time the queue is empty;
identify, during transmission of the burst of data, a minimum between the amount of credit arriving from the receiving computer and the fraction of the link capacity calculated by the first computer for transmission to the receiving computer;
calculate an expected duration of time for transmission of the data to the receiving computer based at least on the minimum; and
determine a mismatch between expected duration of time and the duration of time for transmission of the burst of data.

15. The system of claim 14, wherein the duration of time of the transmission of the burst of data is based on the time the queue is empty and corresponding data of the burst of data has been acknowledged by the receiving computer.

16. The system of claim 14, wherein the sending computer is further configured to calculate the expected duration of time based further on the amount of credit and the fraction of link capacity identified for each time period during the transmission of the burst.

17. The system of claim 14, wherein the sending computer is further configured to identify the fraction of link capacity as a fraction of outgoing edge link capacity available at the sending computer for any one receiving computer.

18. The system of claim 14, wherein the sending computer is further configured to determine the start of the duration time from a time the queue builds data to be transmitted to the receiving computer.

19. A non-transitory computer-readable medium including computer code instructions stored thereon, the computer code instructions when executed by one or more processors of a sending computer cause the one or more processors:
transmit a burst of data, from a queue of data maintained by the sending computer, to the receiving computer;
receive, during transmission of the burst of data, from the receiving computer an amount of credit for the sending computer to transmit data to the receiving computer;
identify, during transmission of the burst of data, a fraction of link capacity of the sending computer that can be used for the sending computer to transmit the burst of data given a number of other receiving computers to which the sending computer is transmitting data;
determine a duration of the transmission of the burst data based on at least a time from a start of transmission of the burst of data from the queue to a time the queue is empty;
identify, during transmission of the burst of data, a minimum between the amount of credit arriving from the receiving computer and the fraction of the link capacity calculated by the first computer for transmission to the receiving computer;
calculate an expected duration of time for transmission of the data to the receiving computer based at least on the minimum; and
determine a mismatch between expected duration of time and the duration of time for transmission of the burst of data.

20. The non-transitory computer-readable medium of claim 19, including computer code instructions stored thereon, the computer code instructions when executed by one or more processors of the sending computer cause the one or more processors to:
calculate the expected duration of time based further on the amount of credit and the fraction of link capacity identified for each time period during the transmission of the burst.

* * * * *